Dec. 18, 1928.  1,695,931
D. H. SCHWEYER
TRAIN CONTROLLING APPARATUS
Filed Aug. 13, 1923  2 Sheets-Sheet 1
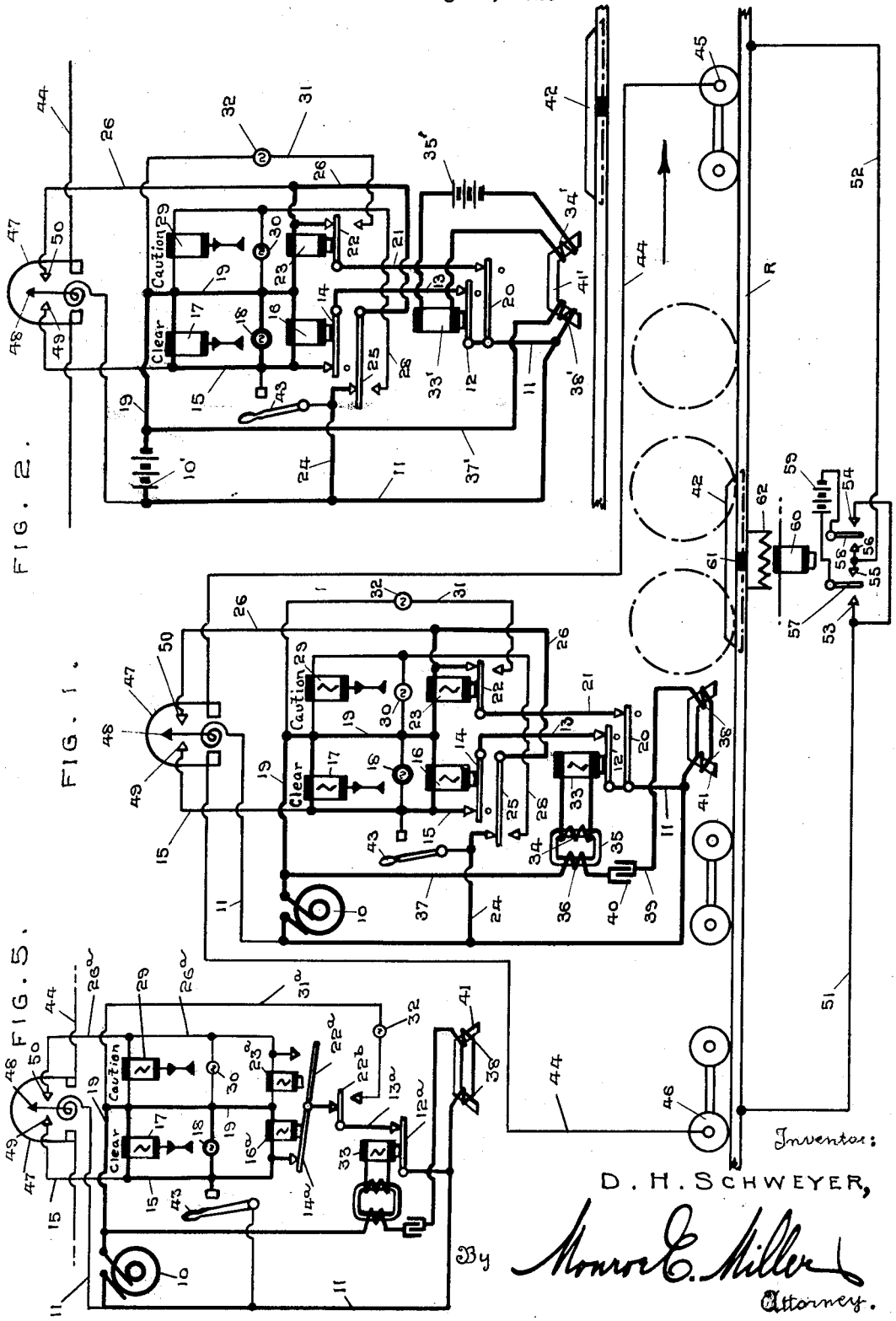
Inventor:
D. H. SCHWEYER,
By Monroe E. Miller
Attorney.

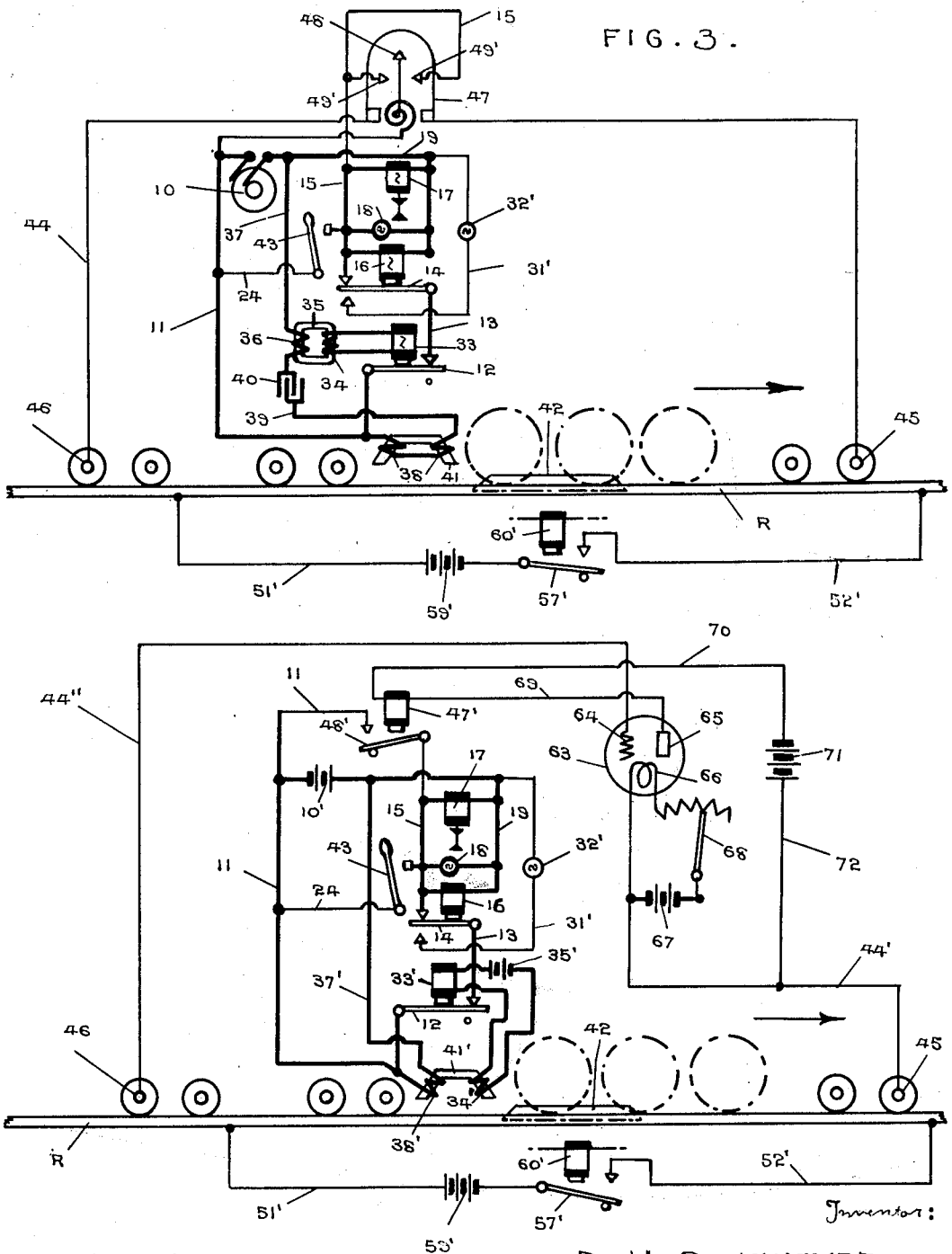

Patented Dec. 18, 1928.

1,695,931

UNITED STATES PATENT OFFICE.

DANIEL HERBERT SCHWEYER, OF EASTON, PENNSYLVANIA.

TRAIN-CONTROLLING APPARATUS.

Application filed August 13, 1923. Serial No. 657,229.

The present invention relates to automatic train control, and is particularly an improvement over the apparatus disclosed in my Patent No. 1,342,873, granted June 8, 1920.

The primary object of the invention is the provision in an automatic train control apparatus, in combination with means for obtaining a danger or other predetermined condition of the vehicle equipment whenever passing a control station of the track, simple and effective means for avoiding such condition and obtaining a clear, caution or other condition of the vehicle equipment; the first-named means being operable in a reliable manner for obtaining the danger or other corresponding vehicle condition whenever passing a control station, to assure of the train being stopped or retarded, and the second-named means only being operable or effective when so intended and with such means in operative condition.

Another object of the invention is the provision of means for eliminating the danger or corresponding condition and for establishing another condition of the vehicle equipment, which is not only simple and efficient, but which also eliminates ramps and similar contact devices, trips, and other obstructions on the track and train; and a further object, in this connection, is to provide such means including a partial train-carried circuit cooperable with a partial track circuit in order to complete a control circuit through a traffic rail of the track, without requiring insulation between the terminals of the partial circuits, although such insulation or semi-insulation can be used.

A still further object is the utilization in an apparatus of the kind indicated of novel means embodied in the train or vehicle equipment capable of control from the track, through one of the traffic rails, without involving cooperating track and train elements other than the rail and wheels of the train.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawings, wherein—

Figure 1 is a diagrammatical view of the apparatus.

Fig. 2 is a similar view illustrating a modification, portions being broken away.

Fig. 3 is a diagrammatical view illustrating a simplified form of the apparatus.

Fig. 4 is a similar view illustrating a further variation in the apparatus.

Fig. 5 is a fragmentary diagrammatical view of another modification.

The train or vehicle equipment, carried by the locomotive or other car of the train, includes an alternating or pulsating current generator 10, which normally energizes a clear or running circuit including the conductor 11, switch 12, conductor 13, switch 14, conductor 15, electro-magnets 16 and 17 and lamp 18 connected in parallel, and conductor 19. The magnet 16 and switch 14 form a stick relay, whereby the magnet 16 being deenergized to let the switch 14 drop open, will keep such circuit open until the magnet 16 is energized by the closing of the circuit therethrough along some other route. The magnet 17 controls an air valve or other device for controlling the locomotive, requiring said magnet to be energized in order to proceed at full speed or under clear conditions.

Another normally energized circuit includes the generator 10, conductor 11, switch 20, conductor 21, switch 22, electro-magnet 23 and conductor 19, and such circuit includes a shunt parallel with the switches 20 and 22, said shunt including the conductor 24 connected to the conductor 11, switch 25 and conductor 26 connected to magnet 23. The switch 22 is under the control of the magnet 23, and the switch 25 is under the control of the magnet 16.

When the switch 25 drops away from the conductor 24 it engages a conductor 28 connected in parallel through an electro-magnet 29 and lamp 30 with the conductor 19. The magnet 29 controls an air valve or other device whereby when said magnet is energized, with the magnet 17 deenergized, caution conditions will prevail in the train or vehicle equipment, requiring the train to proceed below a predetermined speed.

The magnets 17 and 29 control the locomotive or engine, through suitable pneumatic equipment or other means, whereby the magnet 17 being energized will permit the train to proceed as usual, whereas when the magnet 17 is deenergized and the magnet 29 energized, caution conditions will prevail, requiring the train to proceed below a given velocity. When both magnets are deenergized this will produce danger conditions for stopping the train or imposing other restrictions, such as a slow rate of speed. As far as the present invention is concerned, the devices controlled by the magnets 17 and 29 need not be considered in detail, inasmuch as such devices may be of different kinds suitable for the purpose, and the control of the magnets 17 and 29 is the important factor, regardless of the specific mechanism controlled by said magnets.

When the switch 22 drops open by the deenergization of the magnet 23, said switch connects with a conductor 31 leading to the conductor 19 and having a lamp 32 therein. The lamps 18, 30 and 32 or other signalling or translating devices are for the purpose of indicating to the engineer or operator the various conditions, it being noted that the lamps 18 and 30 are parallel with the corresponding magnets 17 and 29. Thus, when the magnet 17 is energized, the lamp 18 is lighted to indicate clear conditions, said lamp being white in color. When the magnet 29 is energized the lamp 30 is lighted to indicate caution conditions, and such lamp is preferably of green, orange or other suitable color accordingly. The lamp 32 is of red color to indicate danger when lighted. Other signal devices can be used in lieu of the electric lamps for giving visual or audible signals or both.

The companion switches 12 and 20 are under the control of an electro-magnet 33, which is normally energized, and which is deenergized whenever passing a control station of the track. This deenergization of the magnet 33 to release the switches 12 and 20 can be obtained in different ways, or said switches opened at each control station by suitable mechanism. As shown, an inductive device is employed for the purpose. Thus, the magnet 33 is connected in circuit with the secondary winding 34 of a step-up transformer 35 and the primary winding 36 of said transformer is continuously supplied with pulsating or alternating current from the generator 10 which is driven by a steam turbine or other prime mover on the vehicle. The circuit of the primary winding 36 includes the conductor 37, generator 10, conductor 11, a choke coil 38, conductor 39 and a condenser 40. The choke coil 38 is wound on a core 41, preferably having its poles or end portions directed downwardly, to pass closely over a stationary inert armature or choke coil core section 42 of iron or other magnetic material mounted on the track or road bed at each control station of the track. The armature or inductor 42 simply consists of a block or body of iron or other magnetic material mounted between the rails or at one side of the track, and the choke coil 38 and its core 41 are supported from the locomotive or vehicle so as to pass over the armature 42 in inductive relation therewith. Each armature 42 preferably rises a distance above the plane of the treads of the traffic rails R, whereby the inductive action between the choke coil and armature is greater than between the choke coil and rails at crossings or switches, in order that undesirable stops can be avoided in the movement of the choke coil over rails, bridges or other magnetic objects, inasmuch as the choke coil is only effective when passing over the armature 42, the clearance between the choke coil core 41 and armature 42 being appreciably and sufficiently less than between the choke coil core and other iron or magnetic objects along the track so that the desired action is only obtained when passing the armatures at control stations or points of the track.

The condenser 40 is of sufficient capacity to more than balance or neutralize the inductive reactance of the choke coil 38 under normal conditions. The capacity and inductive reactances balance one another substantially, although they are made not precisely equal for a purpose as will appear presently. While the train is running in a block between track armatures the capacity reactance of the primary circuit including the primary transformer winding 36, due to the condenser 40, more than offsets the inductive reactance due to the choke coil 38, and the current and electrical force of the primary circuit are almost or practically in phase with each other. When the choke coil passes over rails at a crossing or switch or over other iron or magnetic objects on the road bed flush with the rails or lower, the inductive reactance will be increased slightly, but, under normal conditions the capacity reactance is slightly greater than the inductive reactance so that when the choke coil passes over a rail or other magnetic object, other than the armature 42, then the inductive and capacity reactances approach or obtain an even balance, so that the impedance approaches or is closely equal to the ohmic resistance. The impedance thus decreases when the choke coil passes over a rail or similar object owing to the inductive reactance becoming equal to or nearly equal to the capacity reactance. When the choke coil passes over a track armature 42, the air gap between the ends of the core 41 is substantially bridged by the armature 42, thus completing a magnetic circuit of low reluctance for the choke coil and greatly increasing the inductive reactance thereof. The core 41 comes closer to the armature 42 than to the rails at a crossing or other magnetic objects on the road bed, and consequently the impedance of the primary circuit, including the winding 36, is greatly increased at this time, and the current flowing through the primary circuit is therefore markedly cut down by the track armature.

Inasmuch as current is induced in the secondary circuit, including the winding 34 and magnet 33, from the primary circuit, the drop in the secondary circuit will be amplified. The normal flow of current through the primary of the transformer 35 induces a secondary current through the magnet 33 sufficiently to insure that the switches 12 and 20 will remain closed while the train is traveling in a block between track armatures, whereas when the choke coil 38 passes over a track armature 42, the drop in the primary current due to the considerable increase in impedance, produces a drop in the secondary circuit which is proportionally greater, with the result that the relay coil or magnet 33 is deenergized to release the switches 12 and 20.

Owing to the relatively large change in circuit conditions which is obtained with an arrangement of the above character, the normal current through the relay magnet or coil 33 may be maintained at a high value to insure that the magnet will not become accidentally deenergized, and yet the action of the track armatures 42 insure that the relay or magnet will be with certainty deenergized at the proper time. Therefore, whenever passing a control station or point of the track, the choke coil 38 passing over the armature 42, will result in the magnet 33 being deenergized and the switches 12 and 20 opened.

The magnet 33, as well as the magnets 16, 17, 23 and 29 are all alternating or fluctuating current magnets, inasmuch as the magnets are supplied with alternating or pulsating current.

In order to clear the vehicle equipment, a clearing switch 43 is provided to bridge the conductors 15 and 24 parallel with the switch 14. When the switch 43 is closed, the circuit includes the generator 10, conductor 11, conductor 24, switch 43, conductor 15, magnets 16 and 17, and conductor 19, so that the magnet 16 is reenergized to attract the switches 14 and 25 to restore clear conditions. The switch 43 is preferably under lock and key or otherwise arranged so that the vehicle equipment can only be cleared under proper authority or by complying with specified requirements. The switch 43 when closed may also result in the energization of the magnets 23 and 29 and lamp 30, but this will not in any way interfere with the intended operation of the apparatus, inasmuch as soon as the switch 43 is opened the circuits thereof are opened so that they must be completed through other switches as hereinbefore described.

For modifying the periodic control obtained by the movement of the choke coil past the track armatures, secondary control means is provided for closing holding circuits for the magnets 16 and 23 to obtain clear and caution or other corresponding conditions selectively. When passing a control station, so that the switches 12 and 20 drop open, it is necessary that the magnet 16 remain energized to preserve clear conditions, and if the magnet 16 becomes deenergized, it is necessary that the magnet 23 be energized to obtain caution conditions. This is due to the fact that the switch 12 moving open will open the circuit of the magnet 16, letting the switch 14 drop open, so that the magnet 16 as well as the magnet 17 will remain deenergized, even though the switch 12 is again closed when the choke coil leaves the armature 42. The switch 25 being dropped by the magnet 16 and the switch 20 being dropped by the magnet 33, will open the circuit of the magnet 23 so that said magnet will be deenergized. However, even though the switch 20 moves open, if the magnet 16 remains energized, the magnet 23 is supplied with current by way of the conductor 24, switch 25 and conductor 26 between the generator lead conductors 11 and 19.

The secondary control means, forming the gist of the present invention, includes a partial circuit 44 carried by the train or vehicle and comprising a cable or conductor having extremely small resistance, said conductor or cable being of a good electrical conductor and being of sufficiently large cross-section so that its resistance is small enough for the purpose. The opposite ends of the conductor or partial circuit 44 are connected to wheels of the train separated longitudinally as far as practical. Thus, the forward end of the conductor 44 can be connected to the pilot or pony truck 45 of the locomotive, and the rear end of said conductor can be connected to the rear truck 46 of the tender, and although the rail R and the locomotive and tender electrically connect the ends of the conductor 44, such conductor is connected in parallel with the rail so that current supplied to the rail will not all follow the rail, and a small percentage of the current will flow along said conductor 44. Insulation can be provided between the locomotive and tender, but such insulation is not necessary, inasmuch as a few milliamperes of current will flow in the conductor 44 out of say six or twelve volts supplied by the track battery as hereinafter described.

A galvanometer relay 47 is disposed in the conductor or partial circuit 44 and constitutes the controlling device for obtaining caution and clear or corresponding conditions in the vehicle equipment, said relay or device 47 being sensitive to feeble electrical current (a few milliamperes) flowing in the conductor 44, and includes a switch 48, which may be a pointer or arm of light weight so as to be moved one way or the other from neutral or intermediate position by polarized current flowing through the conductor 44. The relay 47 is so constructed or adjusted that under normal conditions the switch 48 will remain in neutral position, and when a feeble current flows along the conductor 44 in either direction, the switch 48 is moved in the corresponding direction from intermediate position. The relay 47 has a pair of contacts 49 and 50 at the opposite sides of the switch 48 to which the conductors 15 and 26 are connected, respectively, whereas the conductor 11 is connected to the switch 48, so that said switch, in contacting with the contact 49, will connect the conductors 19 and 15 parallel with the switches 12 and 14, and so that the switch 48 in engaging the contact 50 will connect the conductors 11 and 26 parallel with the switches 20 and 22 and the switch 25.

As hereinbefore described, the magnet 33 is deenergized whenever passing a control station, due to the action resulting from the chock coil 38 passing the armature 42, so that the switches 12 and 20 drop open, thereby opening the circuits of the magnets 16 and 23 through said switches 12 and 20, but the switch 48 of the secondary responsive device or relay 47 can establish alternate holding circuits for the magnets 16 and 23, in order that "danger", "caution" and "clear" conditions may be obtained in the vehicle or train equipment for effecting the stopping of the train, the travel of the train below a predetermined speed or the stopping thereof if the train exceeds the given speed, and the permission to proceed unrestricted as to speed, which different conditions are briefly described as follows:

1. *"Danger."*—If, in passing an armature 42, the switch 48 remains in neutral position, with the switches 12 and 20 opened, the circuits of the magnets 16 and 23 are opened, so that said magnets become deenergized, and the switch 14 dropping open will also open the circuit of the magnet 17, thereby deenergizing the magnet 17 as well as the magnet 29 which is normally deenergized, and both magnets 17 and 29 being deenergized will produce a danger condition requiring the train to stop. The switches 14, 22 and 25 being released will remain open, even though the switches 12 and 20 are again closed after passing the armature 42. The magnets 16 and 23 therefore remain deenergized. The switch 22 being in its lower position will connect the conductors 21 and 31, so that the danger lamp 32 is lighted or other danger signal given, the circuit of the lamp 32 including the generator 10, conductor 11, switch 20 which is reclosed after leaving the control station, conductor 21, switch 22, conductor 31 and lamp 32 therein, and conductor 19. The magnets 17 and 29 are thus both deenergized for establishing danger conditions, and the lamp or signal 32 indicates such condition.

2. *"Caution."*—If, when the choke coil 38 passes an armature 42 at a control station, there is current flowing through the conductor or partial circuit 44 in one direction, so that the switch 48 is moved against the contact 50, when the switches 12 and 20 are opened, caution conditions will be established in the train equipment. The switch 12 being opened will denergize the magnets 16 and 17, and the switches 20 and 25 being opened, would, under danger conditions, deenergize the magnet 23, but an alternate holding circuit for the magnet 23 is established by the switch 48 engaging the contact 50, such alternate holding circuit including the generator 10, conductor 11, switch 48, contact 50, conductor 26, magnet 23 and conductor 19. The magnet 23 is thus kept energized even though the switches 12, 14, 20 and 25 have been opened, thereby keeping the switch 22 raised. Then, when the switches 12 and 20 are again raised in leaving the control station, the switches 14 and 25 remain down because the magnet 16 remains deenergized. The circuit of the magnet 23 now includes the generator 10, conductor 11, switch 20, conductor 21, switch 22, magnet 23 and conductor 19, the same as under clear conditions, and the switch 25 being down in engagement with the conductor 28, will result in the magnet 29 and lamp 30 being energized to establish and maintain caution conditions. The circuit of the magnet 29 and lamp 30 includes the generator 10, conductor 11, switch 20, conductor 21, switch 22, conductor 26, switch 25, conductor 28, magnet 29 and lamp 30, and conductor 19. The magnet 17 is thus deenergized and the magnet 29 energized for caution conditions, with the caution lamp 30 lighted to indicate such condition.

3. *"Clear."*—When passing a control station, should current flow through the conductor 44 in the opposite direction as compared with caution conditions, so that the switch 48 is moved against the contact 49, when the switches 12 and 20 drop open, then clear conditions are established or maintained. Thus, although the switches 12 and 20 drop open, the magnets 16 and 23 remain energized, by the establishment of an alternative holding circuit for the magnet 16. Such circuit includes the generator 10, conductor 11, switch 48, contact 49, conductor 15, magnets 16 and 17 and lamp 18, and conductor 19. Thus, with the switch 48 against the contact 49, the magnet 16 is kept energized while the choke coil passes the armature 42, to prevent the magnet 16 being deenergized while the switches 12 and 20 are open. Even though the switch 20 is opened, the switch 25 remains in engagement with the conductor 24, to keep the magnet 23 energized, the circuit of the magnet 23 (while the switch 20 is open) including the generator 10, conductor 11, conductor 24, switch 25, conductor 26, magnet 23 and conductor 19. Clear conditions are thus maintained, and if the train was proceeding under caution or danger conditions, the movement of the switch 48 against the contact 49 will reestablish clear conditions by energizing the magnets 16 and 17.

The arrangement is a normal danger one, inasmuch as danger conditions are established in the vehicle equipment when the choke coil 38 passes the armature 42, whereby the primary responsive element or magnet 33 becomes deenergized to release the switches 12 and 20, and current is required for the secondary responsive device or relay 47 to move the switch 48 one way or the other to provide for clear or caution conditions accordingly. The current for the conductor or partial circuit 44 is obtained from the track as will presently appear.

The track part of the apparatus at each control station comprises a partial circuit having its terminals connected to the rail R and supplied with polarized current from a track battery through a polarized reversing relay, whereby the control of the secondary responsive device or relay 47 is obtained without ramps, trips, or other elements or obstructions between the track and train other than the wheels of the trucks 45 and 46 and the rail R. The partial track circuit includes the conductors 51 and 52 connected at their opposite ends to the rail R at a suitable distance apart, preferably about the same distance as the ends of the conductor or partial circuit 44 are spaced apart. The conductor 51 is connected to contacts 53 and 54 of a polarized reversing relay, and the conductor 52 is connected to contacts 55 and 56 of such relay, the relay having polarized switches 57 and 58 which, when the relay is deenergized are in normal neutral or intermediate position, with the switch 57 between the contacts 53 and 55 and with the switch 58 between the contacts 54 and 56. The switches 57 and 58 are connected to the opposite poles of the track battery 59 or other source of electrical current, and the switches are controlled by a magnet 60 which is connected in circuit with the wayside signal apparatus, whereby the magnet 60 is deenergized when danger track conditions exist, and so that the current flows through the magnet in one direction for clear conditions and flows through the magnet in the opposite direction for caution conditions. Thus, assuming for clear conditions, the current flows through the magnet 60 so as to move the switches 57 and 58 against the contacts 55 and 54, respectively, the flow of current from the battery 59 will be along the switch 58, contact 54, and conductor 51, and returning by way of the conductor 52, contact 55 and switch 57. Under caution conditions with the current flowing through the magnet 60 in the opposite direction, the switches 57 and 58 are moved against the contacts 53 and 56, whereby the current from the battery 59 flows by way of the switch 58, contact 56 and conductor 52, returning by way of the conductor 51, contact 53 and switch 57. Thus, by reversing the flow of current through the polarized track relay, the switches 57 and 58 of the relay alternately connect the conductors 51 and 52 with the opposite poles of the track battery 59, whereas when the track relay is deenergized, the conductors 51 and 52 are not only disconnected from one another but are also disconnected from the track battery.

It is preferable, although not necessary, to use an insulated joint 61 in the rail R between the opposite ends of the conductors 51 and 52, and to bridge the insulated joint by suitable resistance 62. Thus, although current can flow along the rail R between the conductors 51 and 52, such as in a signal circuit, the flow of current from the battery 59 through the partial track circuit will encounter the resistance 62 in flowing along the portion of the rail R between the opposite terminals of the conductors 51 and 52.

If the wayside signal apparatus is such that current flows through the rails, resulting in a portion of the current flowing through the conductor 44, the current supplied by the battery 59 is of higher potential than the current of the wayside signal apparatus, and the relay 47 is not appreciably sensitive to the wayside signal current, so that said relay is only operated by current from the battery 59. In other words, although the relay 47 is sufficiently sensitive to respond to current from the battery 59, it is not sufficiently sensitive to respond to the weaker wayside signal current.

*Operation.*

*Normal running conditions.*—When the train is proceeding under normal running or clear conditions in a block between the armatures or inductors 42 the primary circuit from the generator 10 through the choke coil 38, condenser 40 and primary winding 36 will be energized by normal current flow. As stated hereinbefore, the capacity, under such conditions, practically neutralizes the inductive reactance of the coil 38 in such a way as to permit a current of relatively high value to pass through the circuit. Moreover, when the coil 38 passes over rails or other magnetic objects at crossings and elsewhere, the impedance may even be decreased, to increase the current flow in the circuit, and therefore cause the switches 12 and 20 to stick more tightly against their contacts by the added energization of the magnet 33. Such magnet is therefore kept energized and the switches thereof closed by the induced current through the secondary of the transformer 35.

The normal clear circuit includes the generator 10, conductor 11, switch 12, conductor 13, switch 14, conductor 15, magnets 16 and 17 and lamp 18, and conductor 19, keeping the magnets 16 and 17 energized and the clear lamp 18 lighted. Another circuit includes the generator 10, conductor 11, switch 20, conductor 21, switch 22, magnet 23 and conductor 19, to keep the magnet 23 energized, and said magnet is disposed in another circuit including the generator 10, conductor 11, conductor 24, switch 25, conductor 26, magnet 23 and conductor 19.

When starting, with the magnets 16, 17 and 23 deenergized and the magnet 33 energized to close the switches 12 and 20, the clearing switch 43 is closed, thus completing the circuit including the generator 10, conductor 11, conductor 24, switch 43, conductor 15, magnets 16 and 17 and lamp 18, and conductor 19. The switches 14 and 25 are therefore raised, and the magnet 23 is thereby energized, the circuit of the magnet 23 including the generator 10, conductor 11, conductor 24, switch 25, conductor 26, magnet 23 and conductor 19. Running conditions are thus established by the closing of the switch 43 so that the train can proceed, and said switch is then opened. Said switch 43 is either under lock and key or otherwise arranged so as to be operated only by an authorized person or under required conditions.

*Danger conditions.*—When a block of the track is under danger conditions, the relay magnet 60 at the entrance end of the block is deenergized, whereby the switches 57 and 58 are in normal position, with the track circuit open and deenergized, so that the conductor or vehicle circuit 44 does not receive current from the battery 59. The relay 47 thus remains in normal position while passing the control station in entering the danger block. Accordingly, when the choke coil 38 passes over the armature 42, the switches 12 and 20 drop open, thereby deenergizing the magnets 16 and 23, and the magnet 17 is also deenergized to establish danger conditions, inasmuch as the magnet 29 also remains deenergized. When the choke coil leaves the armature 42, so that the switches 12 and 20 are again closed, the switches 14, 22 and 25 remaining down will prevent the magnets 16, 17, 23 and 29 from being energized, so that danger conditions are in force, to require the stopping of the train or the slow travel thereof in order that a quick stop can be made if necessary to avoid a collision or accident.

The lamp 32 is lighted to indicate danger conditions, the circuit including the generator 10, conductor 11, switch 20, conductor 21, switch 22, conductor 31 having the lamp 32 therein, and conductor 19.

If the switch 43 is closed by proper authority or under required conditions, the vehicle equipment is cleared, as hereinbefore described, so that the train can proceed without speed restriction.

*Clear conditions.*—When the track is clear ahead, the current flows through the relay magnet 60 in a direction to move the switches 57 and 58 against the respective contacts 55 and 54, so that current flows from the battery 59 through the conductor 51 and returns by way of the conductor 52. Then, when the choke coil 38 passes over the armature 42 at the control station at the entrance of the clear block, the conductor 44 of the vehicle or train and conductors 51 and 52 of the track complete a circuit with the ends of the conductor 44 connected almost directly with the opposite ends of the conductors 51 and 52, with only short portions of the rail R between said conductors, so that very little of the rail resistance is interposed in the circuit. Even though the resistance of the conductor 44 is greater than the resistance offered by the portions of the rail R and the locomotive and tender between the terminals of the conductor 44, a small portion of the current will flow through the conductor 44 from the battery 59 although the major part of the current will flow through the shunt or short circuit afforded by the rail and metal parts of the locomotive and tender. If the locomotive and tender are insulated from one another, this may help somewhat, although same is not necessary with proper adjustments of the relay 47, and the insulated joint 61 and resistance 62 will increase the flow of current through the conductor 44 under these conditions.

Now, with the choke coil 38 passing over the armature 42 and the switches 12 and 20 open, the relay 47 establishes alternate holding circuits for the magnets 16 and 23 to preserve or establish clear conditions. Thus, the conductor 44 having its terminals connected to the opposite terminals of the conductors 51 and 52 will complete a circuit including the battery 59, switch 58, contact 54, conductor 51, rail R, truck 46, conductor 44 and relay 47 therein, truck 45, rail R, conductor 52, contact 55 and switch 57. The flow of current being forwardly in the conductor 54 will energize the relay 47 to move the switch 48 against the contact 49, and although the switches 12 and 20 are open for a moment, the switch 48 keeps the magnets 16 and 23 energized. The circuit includes the generator 10, conductor 11, switch 48, contact 49, conductor 15, magnets 16 and 17 and lamp 18, and conductor 19. This prevents the magnets 16 and 17 from being deenergized, or if they are deenergized in passing the control station, said magnets will be energized to restore clear conditions. Although the switch 20 is open, the switch 25 remaining closed, will keep the magnet 23 energized, the circuit including the generator 10, conductor 11, conductor 24, switch 25, conductor 26, magnet 23 and conductor 19.

When the train leaves the control station, the switches 12 and 20 are reclosed to keep the magnets 16, 17 and 23 energized, and the conductor 44 being moved away from the partial track circuit, will result in the switch 48 moving back to normal or neutral position.

*Caution conditions.*—When the track conditions require caution after passing a control station or point of the track, the current flows through the magnet 60 at such control station in a direction opposite to the flow through the magnet for clear conditions, whereby the switches 57 and 58 are moved against the respective contacts 53 and 56, so that the current flows from the battery 59 through the conductor 52 and returns by way of the conductor 51.

When the choke coil 38 passes over the armature 42, the conductor 44 is connected in circuit with the conductors 51 and 52, the same as under clear conditions, and the flow of current through the conductor 44 will be rearwardly, so that the relay 47 is energized to move the switch 48 against the contact 50. Consequently, when the switches 12 and 20 drop open, the switch 48 remains against the contact 50 during such interval.

The switch 12 being opened will deenergize the magnets 16 and 17 and extinguish the lamp 18, so that the switches 14 and 25 drop down and remain down during caution conditions, and an alternative circuit for the magnet 23 is provided so that said magnet remains energized, such circuit including the generator 10, conductor 11, switch 48, contact 50, conductor 26, magnet 23 and conductor 19. By keeping the magnet 23 energized although the magnets 16 and 17 are deenergized, caution conditions are established.

When the choke coil leaves the armature, so that the switches 12 and 20 are again closed, the switches 14 and 25 remain down so that the magnets 16 and 17 remain deenergized, and the circuit of the magnet 23 includes the generator 10, conductor 11, switch 20, conductor 21, switch 22 which remains up, magnet 23 and conductor 19.

The switch 22 being up and the switch 25 down will result in the magnet 29 being energized, the circuit including the generator 10, conductor 11, switch 20, conductor 21, switch 22, conductor 26, switch 25, conductor 28, magnet 29 and lamp 30, and conductor 19. Thus, with the magnet 17 deenergized and the magnet 29 energized caution conditions will prevail, the lamp 30 being lighted to indicate the fact. Should the choke coil 38 pass an armature 42 without the relay 47 being energized, the switch 20 dropping open will break the circuits of the magnets 23 and 29, so that danger conditions are established.

Fig. 2 illustrates a modification in the vehicle or train equipment, using direct current instead of A. C. circuits, and the magnets 16, 17, 23, 29 and 33' are D. C. coils. The circuits of the magnets 16, 17, 23 and 29 are substantially the same as in Fig. 1, but the control of the primary responsive device or magnet 33' is different, a differential induction receiver being employed in lieu of the choke coil. Such receiver has a core 41' to pass over the armature or inductor 42 at each control station, and two windings or coils 34' and 38' are disposed on said core. The coil 34' is connected in circuit with the magnet 33' and a battery 35', while the coil 38' is connected by conductors 11 and 37' with the main battery 10' that takes the place of the generator 10 of Fig. 1 to supply the magnets 16, 17, 23 and 29, while the battery 35' supplies the magnet 33'. The coils 34' and 38' are so wound on the core 41' that a differential inductive action is obtained, as will presently appear.

When the core 41' is away from a track armature, the current flows from the battery 35' through the coil 34' and magnet 33' to hold the switches 12 and 20 closed, there being no inductive disturbance in the core 41' sufficient to disturb the flow of current in the magnet 33'. However, when the core 41' passes over the armature or inductor 42, a single cycle of alternating current is induced from the coil 38' into the coil 34' and magnet 33' due to the completion of the magnetic circuit of the core 41' by the armature 42, with only slight air gaps between the core and armature, and one-half of such cycle of alternating current induced in the circuit of the magnet 33' opposes and neutralizes the current from the battery 35', the current from battery 35' being weaker than current from the battery 10'. As a result, the magnet 33' is deenergized for an interval to release the switches 12 and 20 with the same results as obtained in the apparatus shown in Fig. 1. The switches 12 and 20 are thus released whenever passing a control station for obtaining a danger condition, unless the relay 47 is operated one way or the other to obtain clear or caution conditions.

Fig. 3 illustrates a simplified or modified apparatus for obtaining two point control, such as for clear and danger conditions, instead of three point control as obtained with the apparati shown in Figs. 1 and 2. The apparatus is therefore simplified because of the elimination of caution conditions.

The normal running or clear circuit includes, as in the apparatus hereinbefore described, A. C. generator 10, conductor 11, switch 12 controlled by the primary responsive device or relay magnet 33, conductor 13, switch 14, conductor 15, magnets 16 and 17 and lamp 18, and conductor 19. The primary circuit includes, the same as in the first form of apparatus, the generator 10, conductor 11, choke coil 38, conductor 39, condenser 40, primary winding 36 of the transformer 35 and conductor 37. The magnet 33 is thus energized under normal conditions, and is deenergized when the choke coil 38 passes over the track armature or inductor 42, to let the switch 12 drop open, which deenergizes the magnets 16 and 17 for obtaining danger conditions. The switch 14, when it drops, closes a circuit including the generator 10, conductor 11, switch 12 when returned to closed position, conductor 13, switch 14, conductor 31' including the danger lamp 32', and conductor 19, whereby the lamp 32' is lighted to indicate danger conditions.

The relay 47 has both contacts 49' connected to the conductor 15, so that the relay need not be polarized, and the track circuit need not be polarized, the battery 59' being disposed in the conductor 51' with a single switch 57' for closing the connection between the conductors 51' and 52', said switch being controlled by a neutral electromagnet 60' in the wayside signal circuit. The magnet 60' is deenergized for danger conditions, so that the switch 57' opens, and said magnet is energized for clear conditions to close the switch 57' so that the current from the battery 59' can flow through the conductor 44.

When passing a control station, with the switch 57' open, danger conditions are established as hereinbefore described, but if the switch 57' is closed with the magnet 60' energized, current will flow from the track circuit through the conductor 44 to energize the relay 47 and move the switch 48 against one of the contacts 49', thereby connecting the conductors 11 and 15 so that the magnets 16 and 17 are kept energized while the switch 12 is open, thus preserving clear conditions.

Fig. 4 shows another modification for obtaining clear and danger conditions, using direct current, the track part of the apparatus being the same as shown in Fig. 3. The circuit of the magnets 16 and 17 is also the same as in Fig. 3, excepting that the generator 10 is substituted by the battery 10' or other source of D. C. energy.

A differential induction receiver is used as in the apparatus shown in Fig. 2, for controlling the switch 12, and the operation and control of the magnet 33' is the same as described in connection with Fig. 2, whereby the switch 12 drops open whenever the receiver passes the armature or inductor 42.

The secondary responsive device includes an audion or similar detector 63, which, as shown, has the grid 64, plate 65 and filament 66. The filament is normally energized by being in circuit with the battery 67 and rheostat or variable resistance 68.

The partial vehicle or train circuit includes the conductors 44' and 44'' connected to the wheels or trucks 45 and 46 and to the filament 66 and grid 64, respectively. A switch 48' is provided for connecting the conductors 11 and 15, the same as the switch 48 connects such conductors in Fig. 3, and the switch 48' is controlled by a relay magnet 47' disposed in the plate circuit of the audion 63. Such circuit includes the plate 65, conductor 69, magnet 47', conductor 70, battery 71, conductor 72, conductor 44' and filament 66.

Under normal conditions, when no or negligible current flows through the conductors 44' and 44'', between the filament 66 and grid 64, there is no appreciable flow of current from the battery 71 across the gap between the plate 65 and filament 66, so that the magnet 47' remains deenergized with the switch 48' open. However, when passing a control station, with the receiver over the armature or inductor 42, so that the switch 12 drops open, if the switch 57' is closed, current will flow from the battery 59' through the conductors 44' and 44'', and the flow of current between the filament 66 and grid 64 will decrease the resistance between the plate 65 and filament 66 so that the current flows from the battery 71 through the magnet 47', to energize said magnet and close the switch 48', thereby keeping the magnets 16 and 17 energized although the switch 12 is open, thereby preserving or establishing clear conditions.

The audion or similar detector 60 provides a sensitive means for detecting the flow of current in the partial vehicle circuit from the track battery, at a control station, in order that the magnet 47' can be energized from the battery 71, and a sensitive galvanometer relay is therefore not necessary in this arrangement.

Fig. 5 depicts the use of polarized magnets in lieu of the neutral relay magnets 16 and 23 as shown in Figs. 1 and 2. Such polarized electro-magnets 16$^a$ and 23$^a$ control a double switch having the switches 14$^a$ and 22$^a$ under the influence of the respective magnets 16$^a$ and 23$^a$, and either magnet when energized holds a switch 22$^b$ closed. The magnets 16$^a$ and 17 and lamp 18 are connected between the conductors 15 and 19, and the magnets 23$^a$ and 29 and lamp 30 are connected between the conductors 19 and 26$^a$, said conductor 26$^a$ being connected to the contact 50 of the responsive device 47.

Under normal running conditions, the magnets 16$^a$ and 17 and lamp 18 are energized, the circuit including the generator 10, conductor 11, switch 12$^a$ controlled by the alternating current releasing magnet 33, conductor 13ᵃ, switch 22ᵇ, switch 14ᵃ held closed by magnet 16ᵃ, conductor 15, magnets 16ᵃ and 17 and lamp 18, and conductor 19. The magnet 16ᵃ being energized holds the switches 14ᵃ and 22ᵇ closed. In passing a clear signal, with the switch 12ᵃ opened, the switch 48 engages the contact 49, to connect the conductors 15 and 19 while the switch 12ᵃ is opened, to keep the magnets 16ᵃ and 17 energized.

The magnets 23ᵃ and 29 are normally deenergized under clear conditions and are energized under caution conditions. Thus, in passing a caution signal, with the switch 12ᵃ open, and the switch 48 engaging the contact 50 during the interval, the magnets 16ᵃ and 17 will be deenergized by failure of current therethrough, and the switch 14ᵃ drops open. The switch 48 engaging the contact 50 will connect the conductors 11 and 26ᵃ, so that current can flow through the magnets 23ᵃ and 29, the circuit including the generator 10, conductor 11, switch 48, contact 50, conductor 26ᵃ, magnets 23ᵃ and 29 and lamp 30, and conductor 19. The magnet 23 being energized will hold the switch 22ᵇ closed, and will close the switch 22ᵃ, thereby assisting in the opening of the switch 14ᵃ. In leaving the control station, so that the switch 12ᵃ closes, while the switch 48 returns to neutral position, the circuit of the magnets 23ᵃ and 29 now includes the generator 10, conductor 11, switch 12ᵃ, conductor 13ᵃ, switch 22ᵇ, switch 22ᵃ, conductor 26ᵃ, magnets 23ᵃ and 29 and lamp 30, and conductor 19. The magnet 29 is now energized and the magnet 17 deenergized to obtain caution control conditions.

Caution and clear conditions are thus established selectively, when passing control stations, by the movement of the switch 48 in one direction or the other, according to the flow of current through the conductor 44. In passing a control station, should no current flow through the conductor 44, both magnets 16ᵃ and 23ᵃ will be deenergized, thereby releasing the switch 22ᵇ, so that the magnets 17 and 29 will both be deenergized to obtain danger conditions. The switch 22ᵇ dropping will engage a conductor 31ᵃ to light the danger lamp 32, the circuit including the generator 10, conductor 11, switch 12ᵃ when closed, conductor 13ᵃ, switch 22ᵇ, conductor 31ᵃ including lamp 32, and conductor 19. The switch 43 can be closed to connect the conductors 11 and 15 in shunt with the switches 12ᵃ and 22ᵇ, in order to clear the apparatus and energize the magnets 16ᵃ and 17.

Having thus described the invention, what is claimed as new is:—

1. The combination of a vehicle track, a controlled trackside circuit at each control station including an electrically continuous portion of the track and having a source of electrical energy, and a vehicle equipment including a normally deenergized vehicle-carried partial circuit connected at its terminals to the track to cooperate with the trackside circuit in parallel with and shunting said portion of the track when passing the control station, means operable when said vehicle-carried circuit passes said portion of the track to produce danger vehicle controlling conditions, and means controlled by electrical energy flowing in said vehicle-carried circuit for obtaining other vehicle controlling conditions.

2. The combination of a vehicle track, a trackside circuit at each control station including an electrically continuous portion of the track and having a source of electrical energy, a relay controlling said circuit, and a vehicle equipment including a vehicle-carried partial circuit connected at its terminals to the track to cooperate with said trackside circuit in parallel with and shunting said portion of the track when passing the control station, electrically energized means for controlling the vehicle, means for deenergizing said electrically energized means when passing the control station, and means controlled by the flow of electrical energy in said vehicle-carried circuit for keeping said electrically energized means energized when passing the control station.

3. The combination of a vehicle track, a controlled trackside circuit at each control station including an electrically continuous portion of the track and having a source of electrical energy, and a vehicle equipment including a vehicle-carried partial circuit connected at its terminals to the track to cooperate with the trackside circuit in parallel with and shunting said portion of the track when passing the control station, an electrical circuit including controlling means energized for running conditions, means for breaking said circuit when passing the control station, and means controlled by the flow of electrical energy in said vehicle-carried circuit for closing the last named circuit through said controlling means when passing the control station.

4. The combination of a vehicle track, a controlled partial trackside circuit at each control station connected at its terminals to the track to include a portion of the track in the circuit and having a source of electrical energy, and a vehicle equipment including a vehicle-carried partial circuit connected at its terminals to the track to cooperate with the trackside circuit in parallel with and shunting said portion of the track when passing the control station, a circuit including controlling means normally energized for running conditions, means operable when passing the control station and including a switch for opening said circuit, and means controlled by the flow of electrical energy in said vehicle-carried circuit and including a switch parallel with the aforesaid switch to keep said circuit closed through said controlling means when passing the control station.

5. The combination of a vehicle track, a trackside circuit at each control station including an electrically continuous portion of one rail of the track, means for supplying electrical current in either direction in said circuit, and a vehicle equipment including a vehicle-carried partial circuit connected at its terminals to said rail to cooperate with the trackside circuit in parallel with and shunting said portion of the rail when passing the control station, and a polarized device operable by the flow of current in opposite directions in said vehicle-carried circuit to obtain different controlling conditions.

6. The combination of a vehicle track, a trackside circuit at each control station including an electrically continuous portion of one rail of the track, a source of electrical energy for said circuit, means for reversibly connecting said source of electrical energy in said circuit, and a vehicle equipment including a vehicle-carried partial circuit connected at its terminals to said rail to cooperate with the trackside circuit in parallel with and shunting said portion of the rail when passing the control station, a polarized relay operable by the flow of current in opposite directions in said vehicle-carried circuit, and means controlled by said relay for obtaining different controlling conditions.

7. The combination of a vehicle track, a trackside circuit at each control station including an electrically continuous portion of the track, means for supplying electrical current in either direction in said circuit, and a vehicle equipment including a vehicle-carried partial circuit connected at its terminals to the track to cooperate with the trackside circuit in parallel with and shunting said portion of the track when passing the control station, means for obtaining a predetermined condition when passing the control station, and a polarized device operable by the flow of current in opposite directions in said vehicle-carried circuit for obtaining other controlling conditions.

8. The combination of a vehicle track, a partial trackside circuit at each control station connected at its terminals to the track to include a portion of the track in the circuit, means for supplying electrical current in either direction in said circuit, and a vehicle equipment including a vehicle-carried partial circuit connected at its terminals to the track to cooperate with the trackside circuit in parallel with and shunting said portion of the track when passing the control station, a pair of electro-magnetic means for obtaining different controlling conditions, means for opening the circuits of said electro-magnetic means when passing the control station, and a polarized device operable by the flow of current in opposite directions in said vehicle-carried circuit for establishing alternative holding circuits for said electro-magnetic means.

9. The combination of a vehicle track, a partial trackside circuit at each control station connected at its terminals to the track to include a portion of the track in the circuit, means for supplying electrical current in either direction in said circuit, and a vehicle equipment including a vehicle-carried partial circuit connected at its terminals to the track to cooperate with the trackside circuit in parallel with and shunting said portion of the track when passing the control station, a pair of relay magnets, means operable when passing the control station for opening the circuits of said magnets to obtain a predetermined condition, and a polarized device operable by the flow of current in opposite directions in said vehicle-carried circuit and arranged for closing alternative circuits through said magnets according to the direction of flow of current in said vehicle-carried circuit.

10. The combination of a vehicle track, a partial trackside circuit at each control station connected at its terminals to the track to include a portion of the track in the circuit, means for supplying electrical current in either direction in said circuit, and a vehicle equipment including a vehicle carried partial circuit connected at its terminals to the track to cooperate with the trackside circuit in parallel with and shunting said portion of the track when passing the control station, a pair of relay magnets for obtaining different controlling conditions, a switch device in the circuits of said magnets, means controlling said switch device for opening said circuits at said switch device when passing the control station, and a polarized device including a switch operable in opposite directions by the flow of current in opposite directions in said vehicle-carried circuit and arranged to establish alternative circuits through said magnets parallel with said switch device.

11. The combination of a vehicle track, a controlled trackside circuit including an electrically continuous portion of the track and a source of electrical energy, a vehicle equipment including a normally deenergized vehicle-carried partial circuit connected at its terminals to the track to cooperate with the trackside circuit in parallel with said portion of the track, means for obtaining danger vehicle controlling conditions when the vehicle-carried circuit passes said portion of the track, and means controlled by electrical energy flowing in the vehicle-carried circuit for obtaining other vehicle controlling conditions.

In testimony whereof I hereunto affix my signature.

DANIEL HERBERT SCHWEYER.